United States Patent
Okabe et al.

(10) Patent No.: US 9,415,859 B2
(45) Date of Patent: Aug. 16, 2016

(54) SLAT OF AIRCRAFT, METHOD FOR ADJUSTING ATTACHMENT POSITION OF SLAT, AND AIRCRAFT

(71) Applicant: MITSUBISHI AIRCRAFT CORPORATION, Aichi (JP)

(72) Inventors: Yoshinori Okabe, Aichi (JP); Kenya Ishihara, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 292 days.

(21) Appl. No.: 14/166,411

(22) Filed: Jan. 28, 2014

(65) Prior Publication Data
US 2014/0209734 A1 Jul. 31, 2014

(30) Foreign Application Priority Data

Jan. 29, 2013 (JP) .................................. 2013-014094

(51) Int. Cl.
*B64C 9/22* (2006.01)

(52) U.S. Cl.
CPC ....................... *B64C 9/22* (2013.01)

(58) Field of Classification Search
CPC .............. B64C 9/22; B64C 9/24; B64C 9/02; B64C 9/18; B64C 3/50; B64C 13/30; B64C 13/28; B64C 13/24
USPC ........ 244/213, 214, 215, 216, 217, 99.2, 99.3
See application file for complete search history.

(56) References Cited

U.S. PATENT DOCUMENTS

| | | | | | |
|---|---|---|---|---|---|
| 3,157,090 | A | * | 11/1964 | Ballu | F41H 5/0457 156/701 |
| 4,131,053 | A | * | 12/1978 | Ferguson | F41H 5/0414 109/82 |
| 4,404,889 | A | * | 9/1983 | Miguel | F41H 5/0442 428/118 |
| 4,813,334 | A | * | 3/1989 | Bloks | B32B 15/04 109/82 |
| H1061 | H | * | 6/1992 | Rozner | F41H 5/0457 109/82 |

(Continued)

FOREIGN PATENT DOCUMENTS

JP 2000-211594 A 8/2000

OTHER PUBLICATIONS

Michael C.Y. Niu, "Airframe Structural Design: Practical Design Information and Data on Aircraft Structures", Nagoya Kouku Gijutsu (Nagoya Aviation Technology), Feb. 21, 2000, p. 345.

*Primary Examiner* — Benjamin P Lee
(74) *Attorney, Agent, or Firm* — Pearne & Gordon LLP (57) ABSTRACT

The present invention includes: a slat 3; and a position adjustment mechanism that adjusts an attachment position of the slat 3 to a main wing 1 by causing the slat 3 to swing, the position adjustment mechanism including: a pivot shaft S1 as a center of the swing motion of the slat 3; and a driving shaft S2 that is rotatably supported on a rail 12, and induces the swing motion of the slat 3. The driving shaft S2 includes: a main shaft 30 that causes the slat 3 to swing by acting thereon; an inner-side eccentric bushing 31 that is fixed to the main shaft 30, and eccentric with respect to the main shaft 30; and an outer-side eccentric bushing 32 that is eccentric with respect to the inner-side eccentric bushing 31, rotatably arranged therearound, and supported rotatably with respect to the rail 12.

6 Claims, 9 Drawing Sheets

(56) References Cited

U.S. PATENT DOCUMENTS

| | | | |
|---|---|---|---|
| 6,216,579 B1* | 4/2001 | Boos | B32B 5/26 89/36.02 |
| 7,930,965 B2* | 4/2011 | Ravid | F41H 5/0464 89/36.02 |
| 8,336,439 B2* | 12/2012 | St. Claire | F41H 5/0457 89/36.02 |
| 2006/0266207 A1* | 11/2006 | Cerny | F41H 5/045 89/36.02 |
| 2009/0146014 A1* | 6/2009 | Gyuricsko | B64C 9/22 244/213 |
| 2010/0163685 A1* | 7/2010 | Vormezeele | B64C 9/22 244/214 |
| 2010/0187367 A1* | 7/2010 | Dahl | B64C 9/02 244/213 |
| 2013/0087662 A1* | 4/2013 | Soenarjo | B64C 9/16 244/215 |
| 2014/0059826 A1* | 3/2014 | Schlipf | B64C 1/14 29/426.1 |
| 2014/0061381 A1* | 3/2014 | Gyuricsko | B64C 9/22 244/99.3 |
| 2014/0131512 A1* | 5/2014 | Gyuricsko | F16C 33/74 244/99.3 |
| 2014/0145039 A1* | 5/2014 | Beyer | B64C 9/10 244/215 |
| 2014/0339358 A1* | 11/2014 | Swartley | H01R 41/00 244/99.3 |

* cited by examiner

ROTATION ANGLE = 0°

FIG. 8B

ROTATION ANGLE = 90°

FIG. 8C

ROTATION ANGLE = 180°

FIG. 8D

ROTATION ANGLE = 270°

FIG. 9

PRIOR ART

SLAT OF AIRCRAFT, METHOD FOR ADJUSTING ATTACHMENT POSITION OF SLAT, AND AIRCRAFT

BACKGROUND OF THE INVENTION

1. Field of the Invention

The present invention relates to a slat which is attached to a main wing of an aircraft to generate a high lift, and a mechanism which adjusts an attachment position of the slat to the main wing.

2. Description of the Related Art

A slat as a high-lift device is provided at a main wing of an aircraft. The slat is provided along a leading edge of the main wing. The slat performs an operation required for generating a high lift by a drive mechanism. The slat moves to a deployed position so as to increase a lift during takeoff and landing. Accordingly, in the entire main wing including the slat, a wing side surface has a larger curvature, and a length in a wing chord direction is extended. When the slat is at the deployed position, a gap is formed between a trailing edge of the slat and the leading edge of the main wing. High-energy air is supplied to the gap from bottom up.

The slat needs to be arranged on the main wing with no gap therebetween at a retracted position so as not to disturb a flow of air relative to the main wing. Meanwhile, the gap (value) with the main wing at the deployed position needs to be rigorously controlled so as to obtain a required lift and form an upward flow of air in the gap. Therefore, it is necessary to attach the slat to the main wing with high positional accuracy. Japanese Patent Laid-Open No. 2000-211594 discloses a method for performing fine adjustment (also referred to as rigging) of a position at which the slat is attached to the main wing by use of a gauge.

The slat is attached to a bracket, typically, to a rail. The above fine adjustment of the position is performed by finely adjusting the position of the slat with respect to the rail at the retracted position. However, the rail reciprocates along a predetermined movement path with respect to the main wing. The position of the slat with respect to the rail is thus synonymous with the position of the slat with respect to the main wing. The same applies to the deployed position. The position of the slat with respect to the rail is finely adjusted such that the gap between the slat and the main wing has a required gap value with the slat moved forward to the deployed position.

The slat includes a position adjustment mechanism which performs the fine adjustment. The conventional position adjustment mechanism causes the slat to reciprocate while moving in an arc trajectory with respect to the rail. For example, the position adjustment mechanism includes a configuration shown in FIG. 9 (Author: Michael C. Y. Niu, Translator: Kenichi Doi, Mamoru Makishima, "Airframe Structural Design: Practical Design Information and Data on Aircraft Structures", Nagoya Kouku Gijutsu (Nagoya Aviation Technology), Feb. 21, 2000, p. 345).

Figure 9:
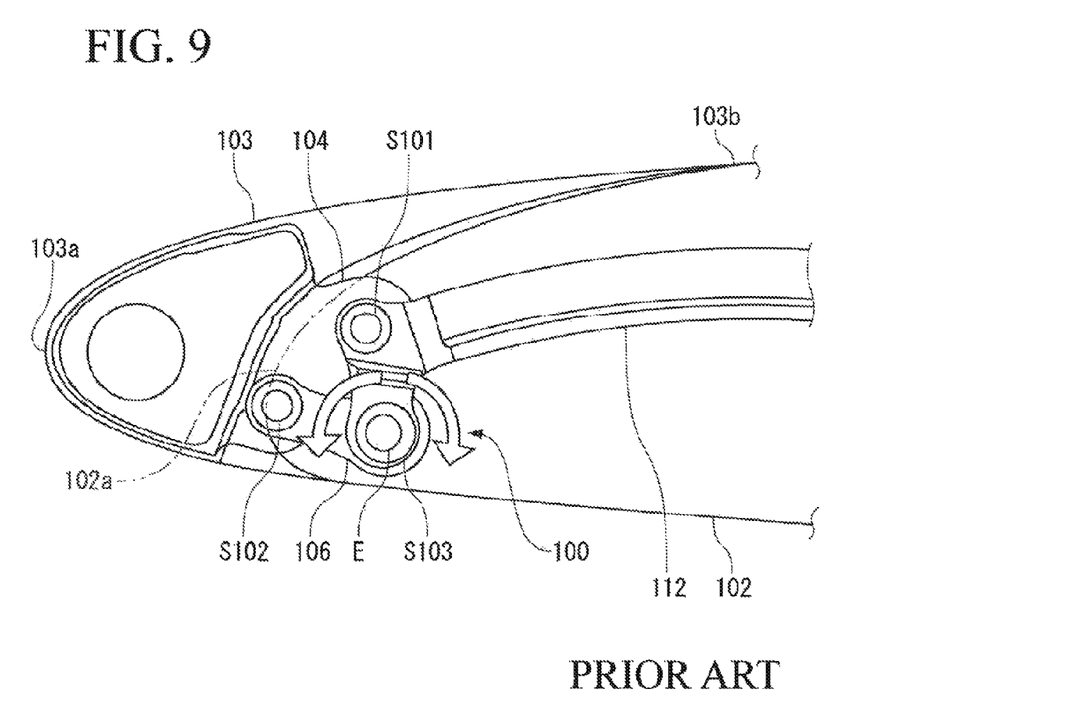
FIG. 9 is a sectional view illustrating a conventional position adjustment mechanism of a slat and corresponding to FIG. 5.

A position adjustment mechanism 100 shown in FIG. 9 causes a slat 103 to swing by applying a three-point link mechanism between the slat 103 and a rail 112.

That is, a pivot shaft S101 is caused to work as a swing rotation center by supporting the slat 103 and the rail 112 on the pivot shaft S101 so as to allow relative rotation therebetween. A link member 106 is also provided between the slat 103 and the rail 112. The slat 103 and the link member 106 are supported so as to allow relative rotation therebetween by a fixed shaft S102, and the rail 112 and the link member 106 are supported so as to allow relative rotation therebetween by a driving shaft S103. The driving shaft S103 includes an eccentric shaft E. The link member 106 is locked to the eccentric shaft E. Thus, when the driving shaft S103 is rotated, the slat 103 can be caused to swing about a swing axis composed of the pivot shaft S101.

In the rigging, the driving shaft S103 is rotated so as to bring a trailing edge 103b of the slat 103 into contact with a main wing 1 with no gap therebetween when the slat 103 is at the retracted position. After that, it is checked whether the gap between the slat 103 and the main wing 1 has a required gap value when the slat 103 is moved to the deployed position.

The position adjustment mechanism 100 in FIG. 9 has a following problem.

As shown in FIG. 9, a swing arm 104 that supports the pivot shaft S101 and the fixed shaft S102 is provided integrally with the slat 103 so as to constitute the three-point link mechanism. That is, the swing arm 104 is larger than a distance between the pivot shaft S101 and the fixed shaft S102, and arranged within a main wing body 102. It is thus necessary to provide a cutout in a leading edge 102a of the main wing body 102 so as to allow the swing arm 104 to reciprocate therein. The cutout could disturb an air current flowing between the slat 103 and the main wing body 102 when the slat 103 is deployed. The cutout is thus preferably made smaller. Especially when the main wing body 102 is thin, the size of the cutout is fatal even when the same three-point link mechanism is used. This is because an air current received from a front side enters the cutout to form a vortex and become resistance. When the main wing is thin, it is particularly necessary to decrease the size of the cutout so as to cause the air current to flow along the surfaces of the slat 103 and the main wing body 102 by avoiding the cutout.

In the position adjustment mechanism 100, the pivot shaft S101 is distant from a leading edge 103a of the slat 103, and the slat 103 has a large rotation radius about the pivot shaft S101. Therefore, when the driving shaft S103 is rotated in the rigging, a travel distance of the slat 103 per unit rotation angle is increased. It is thus difficult for the position adjustment mechanism 100 to perform the rigging while moving the slat 103 little by little.

Thus, an object of the present invention is to provide a slat which can stabilize an air current flowing between the slat and a main wing by decreasing the size of a cutout in the main wing required for providing a position adjustment mechanism.

Another object of the present invention is to provide a slat which can facilitate a rigging operation by locating a pivot position of a swing motion of the slat closer to a leading edge of the slat, and thereby decreasing a unit travel distance of the slat in the rigging.

SUMMARY OF THE INVENTION

To achieve the above objects, a slat of an aircraft according to the present invention includes: a slat body that is attached to a bracket capable of reciprocating with respect to a main wing of the aircraft so as to be movable between a deployed position and a retracted position; and a position adjustment mechanism that adjusts an attachment position of the slat to the main wing by causing the slat body to swing, wherein the position adjustment mechanism has following characteristics.

The position adjustment mechanism according to the present invention includes: a pivot shaft as a center of the swing motion of the slat body; and a driving shaft that is rotatably supported on the bracket, and induces the swing motion of the slat body. The driving shaft includes: a main shaft that causes the slat body to swing by acting thereon; and an eccentric body that is supported rotatably with respect to the bracket, and rotates integrally with the main shaft.

In the position adjustment mechanism according to the present invention, the driving shaft has an eccentric function. Thus, the slat body can be caused to swing by using only two shafts including the pivot shaft. Since it is only necessary to provide the two shafts, an occupied space can be reduced as compared to a conventional position adjustment mechanism that requires three shafts. Therefore, a cutout required in a leading edge of the main wing can be made smaller than that of the position adjustment mechanism that requires three shafts.

Since it is only necessary to provide the two shafts, the number of parts can be reduced as compared to the conventional position adjustment mechanism that requires three shafts. The workload of attachment to the slat and the bracket can be also reduced.

The eccentric body according to the present invention may include an inner-side eccentric body and an outer-side eccentric body both having a cylindrical shape. The inner-side eccentric body is fixed to the main shaft, and eccentric with respect to the main shaft. The outer-side eccentric body is eccentric with respect to the inner-side eccentric body, rotatably arranged around the inner-side eccentric body, and supported rotatably with respect to the bracket. The eccentric body including the inner-side eccentric body and the outer-side eccentric body has a so-called double eccentric function.

In the present invention, a so-called crankshaft may be also used as the driving shaft. However, when the eccentric body includes the inner-side eccentric body and the outer-side eccentric body, maintenance can be easily performed, and costs can be reduced.

In the position adjustment mechanism according to the present invention, although the pivot shaft may be arranged at any position, the pivot shaft may be arranged on a side closer to the slat body than the driving shaft. A swing rotation radius can be thereby made smaller than that of reversed arrangement in which the driving shaft is closer to a leading edge of the slat body. Accordingly, an amount of displacement at the leading edge of the slat per unit rotation angle can be decreased when the inner-side eccentric body and the outer-side eccentric body are rotated, so that rigging can be precisely performed.

In the position adjustment mechanism according to the present invention, an eccentricity δ1 of the inner-side eccentric body from the main shaft and an eccentricity δ2 of the outer-side eccentric body from the inner-side eccentric body preferably correspond to each other.

In the position adjustment mechanism according to the present invention, the main shaft can be moved to a required position by properly adjusting respective rotation angles of the inner-side eccentric body and the outer-side eccentric body in the rigging even when the eccentricity δ1 and the eccentricity δ2 differs from each other. However, the workload is increased by properly adjusting the rotation angles. On the other hand, when the eccentricity δ1 and the eccentricity δ2 correspond to each other, the main shaft can be moved to a required position by setting the inner-side eccentric body and the outer-side eccentric body to the same rotation angle.

In the position adjustment mechanism according to the present invention, the inner-side eccentric body may be an inner-side eccentric bushing that is fixed to the main shaft, and the outer-side eccentric body may be an outer-side eccentric bushing that is arranged around the inner-side eccentric body.

Since an integrated unit of the main shaft and the inner-side eccentric body can be considered to have the same form as a crankshaft, the crankshaft may be used for the portion of the main shaft and the inner-side eccentric body in the present invention. A manufacturing cost, however, can be reduced by fixing the inner-side eccentric bushing to the simple cylindrical main shaft as compared to the case in which the crankshaft is formed. When the bushing becomes worn, only the worn portion can be replaced. Thus, a maintenance cost can be also reduced.

When the position of the slat according to the present invention is adjusted, the inner-side eccentric body and the outer-side eccentric body are reversely rotated by a same rotation angle. Accordingly, the main shaft swings (reciprocates) on an arc trajectory, and the slat can be caused to swing by following the main shaft. Thus, the rigging can be performed by adjusting the rotation angles of the inner-side eccentric body and the outer-side eccentric body while sequentially checking the position of the slat.

In accordance with the present invention, the driving shaft of the position adjustment mechanism has the eccentric function. Thus, it is only necessary to provide the two shafts including the pivot shaft. The space occupied by the two shafts can be reduced as compared to the conventional position adjustment mechanism that requires three shafts. Therefore, the cutout required in the leading edge of the main wing can be made smaller than that of the position adjustment mechanism that requires three shafts. An air current flowing between the main wing and the slat can be thereby stabilized.

DETAILED DESCRIPTION OF THE PREFERRED EMBODIMENT

In the following, an embodiment of the present invention is described in detail.

Figure 1:
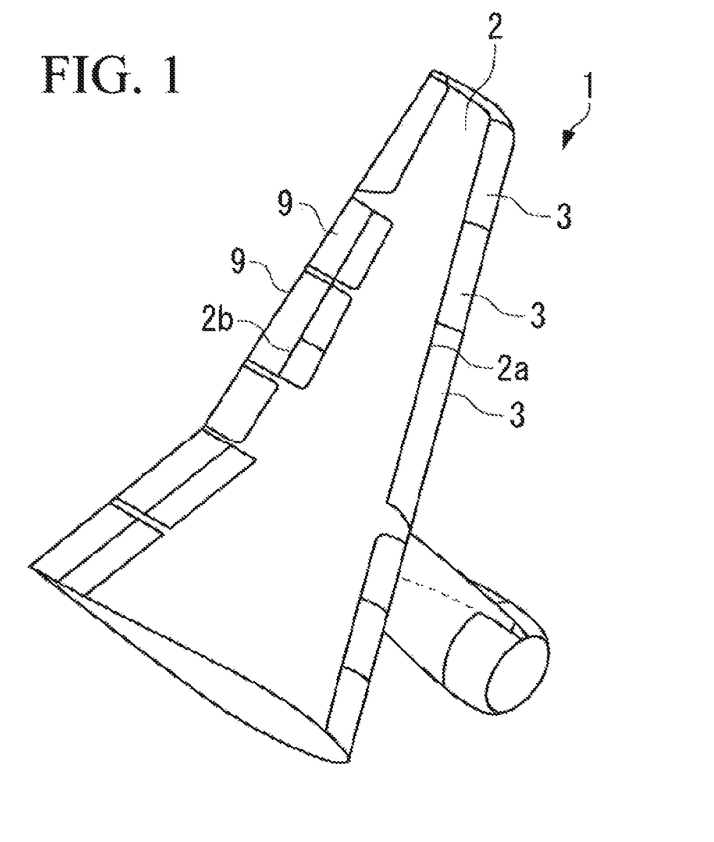
FIG. 1 is a perspective view illustrating a main wing of an aircraft.
Figure 2A:
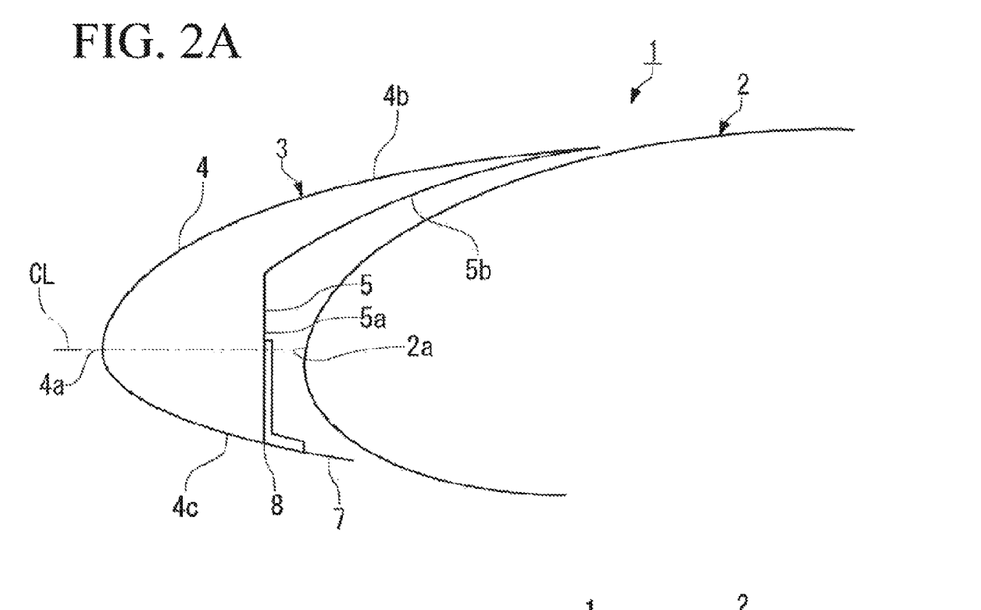
FIGS. 2A and 2B are sectional views illustrating an operation of a slat provided at the main wing.
Figure 2B:
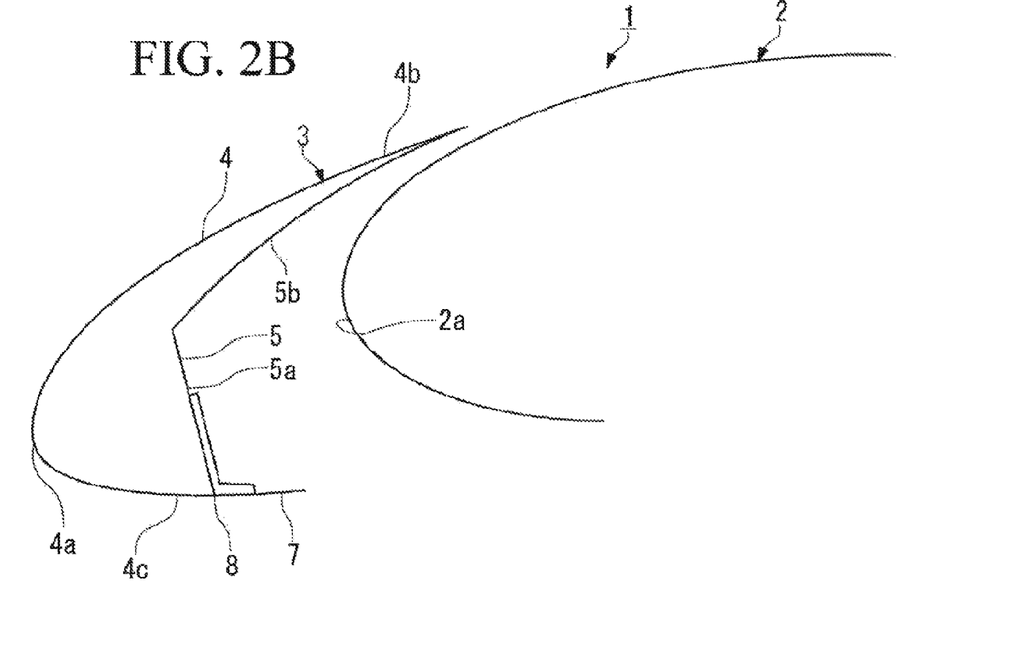

The present embodiment relates to a slat 3 provided at a main wing 1 of an aircraft as shown in FIG. 1 and FIGS. 2A, 2B. The slat 3 is arranged along a leading edge 2a of a main wing body 2. The slat 3 can move between a deployed position and a retracted position described below by a drive mechanism (not shown) provided in the main wing body 2. Normally, a flap 9 is also provided as a high-lift device at a trailing edge 2b of the main wing body 2 in addition to the slat 3.

While the aircraft is cruising, the slat 3 is retracted to the "retracted position" close to the leading edge 2a of the main wing body 2 as shown in FIG. 2A. In this state, the main wing body 2 and the slat 3 almost integrally constitute the main wing 1. In FIG. 2A, the main wing body 2 and the slat 3 are shown apart from each other with intent to discriminate the slat 3 from the main wing body 2.

Meanwhile, when the aircraft is preparing to land, the slat 3 is deployed to the "deployed position" away from the leading edge 2a of the main wing body 2 as shown in FIG. 2B so as to achieve aerodynamic characteristics required in landing. When the slat 3 is deployed, the slat 3 is moved diagonally downward to a front side from the leading edge 2a of the main wing body 2. A gap is thereby formed between the main wing body 2 and the slat 3.

A hull of the slat 3 is composed of a skin 4, a cove 5, and a lower surface plate 7.

The skin 4 includes an upper surface 4b and a lower surface 4c smoothly continuous from a leading edge 4a. The upper surface 4b is formed so as to extend longer toward the main wing body 2 than the lower surface 4c. The lower surface plate 7 is formed integrally with the lower surface 4c.

The cove 5 is a concave portion formed in a region opposing the main wing body 2. When the slat 3 is at the "retracted position" close to the leading edge 2a of the main wing body 2, the leading edge 2a of the main wing body 2 is accommodated within the cove 5. The cove 5 includes a surface 5a perpendicular to a center axis line CL, and an opposing surface 5b that opposes an upper surface of the main wing body 2, and gradually approaches the upper surface 4b of the skin 4. The cove 5 is not limited to the aforementioned configuration, and may include one curved surface. The configuration is not particularly limited.

The lower surface plate 7 is a plate-like member that extends toward the main wing body 2 from a ridge portion 8 at which the lower surface 4c and the cove 5 intersect with each other. The lower surface plate 7 is formed in a fixed state integrally with the skin 4 continuous from the lower surface 4c. For example, the lower surface plate 7 can be formed of aluminum alloy, CFRP (carbon fiber-reinforced plastic), GFRP (glass fiber reinforced plastics), and stainless steel.

Figure 3:
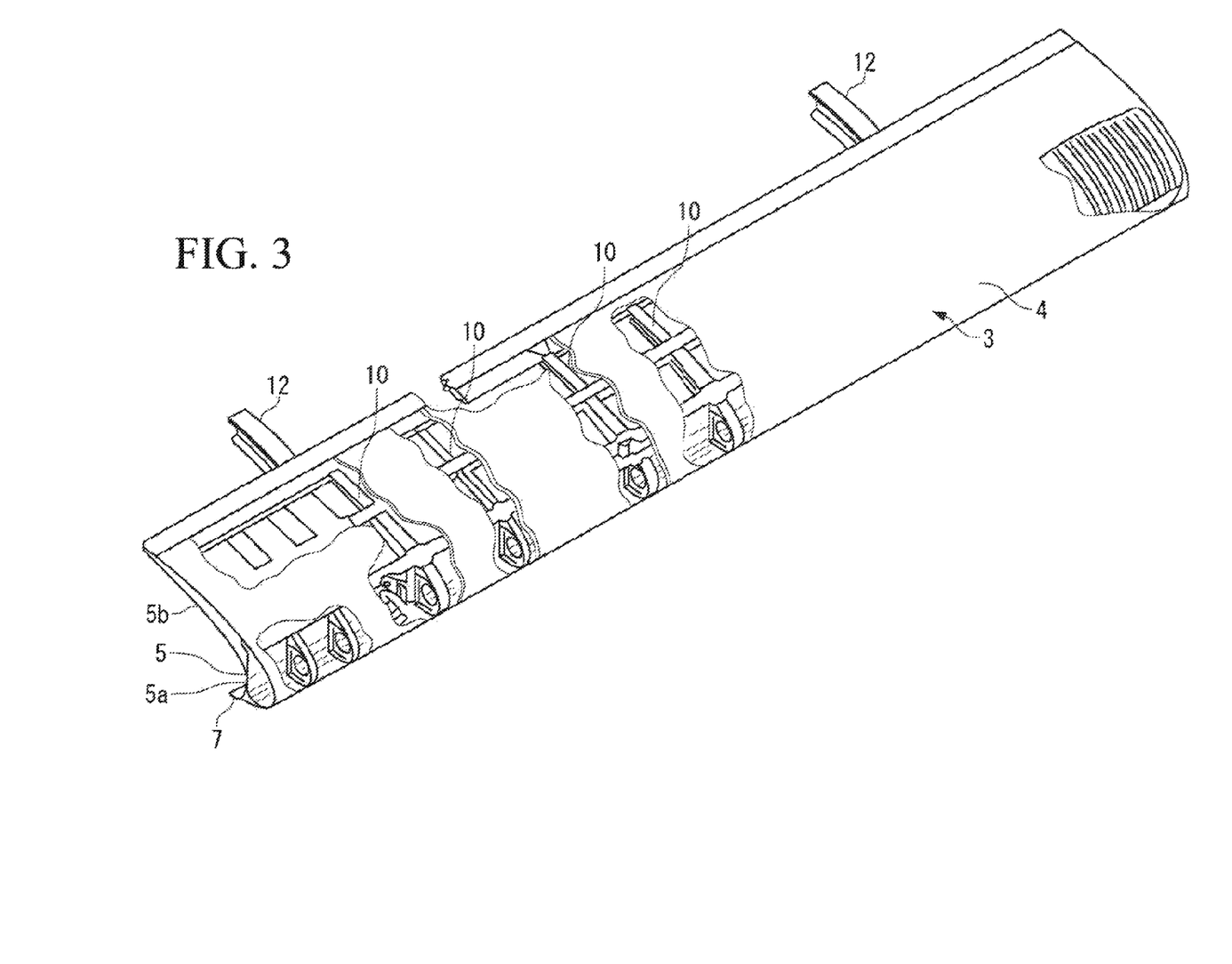
FIG. 3 is a partially-sectional perspective view illustrating the slat provided at the main wing.
Figure 4:
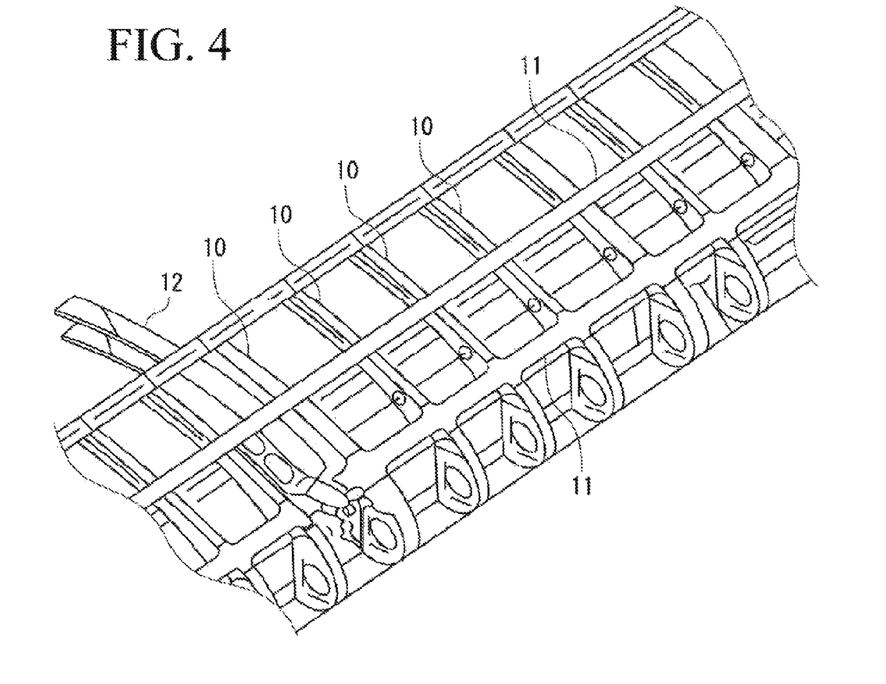
FIG. 4 is a perspective view illustrating a frame member of the slat.

As shown in FIGS. 3 and 4, a plurality of rib members 10 that are arranged at intervals in a wingspan direction of the main wing 1, and a spar 11 that extends in the wingspan direction of the main wing 1 to couple the plurality of rib members 10 are provided as frame members forming a framework within an internal space of the slat 3.

A pair of rails (brackets) 12 that extend toward the main wing body 2 side are provided on the slat 3 corresponding to a pair of rib members 10 spaced apart at a predetermined interval. The rails 12 are preferably provided close to opposite end portions of the slat 3. A rack gear (not shown) is provided on each of the rails 12. A pinion gear that meshes with the rack gear, and a motor that rotates the pinion gear are provided within the main wing body 2. When the pinion gear is rotationally driven by the motor, the slat 3 is driven to reciprocate between the retracted position and the deployed position together with the rail 12.

Figure 5:
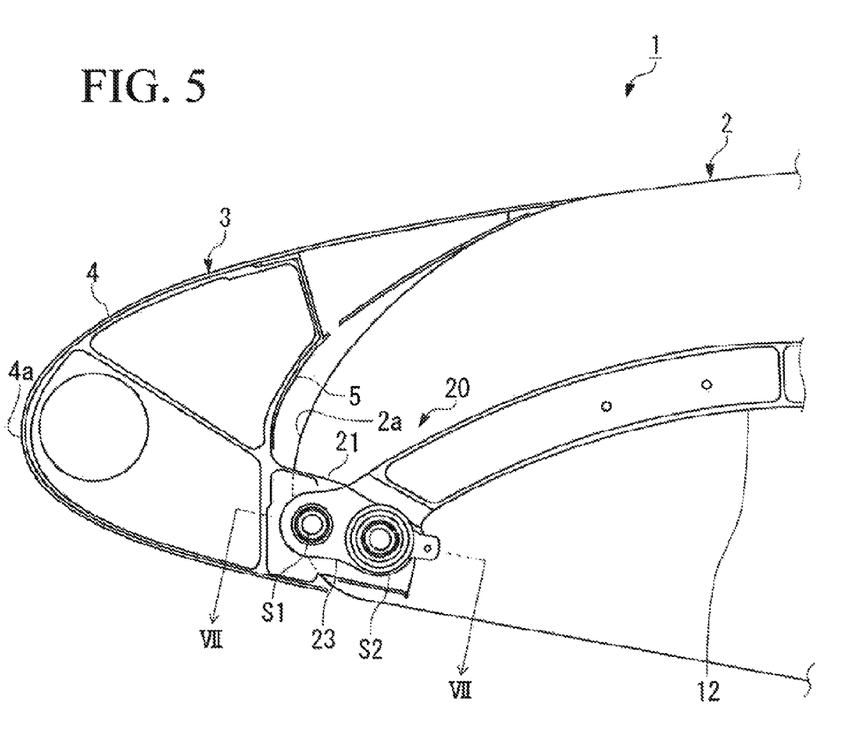
FIG. 5 is a sectional view of a position adjustment mechanism of the slat according to a present embodiment.
Figure 6:
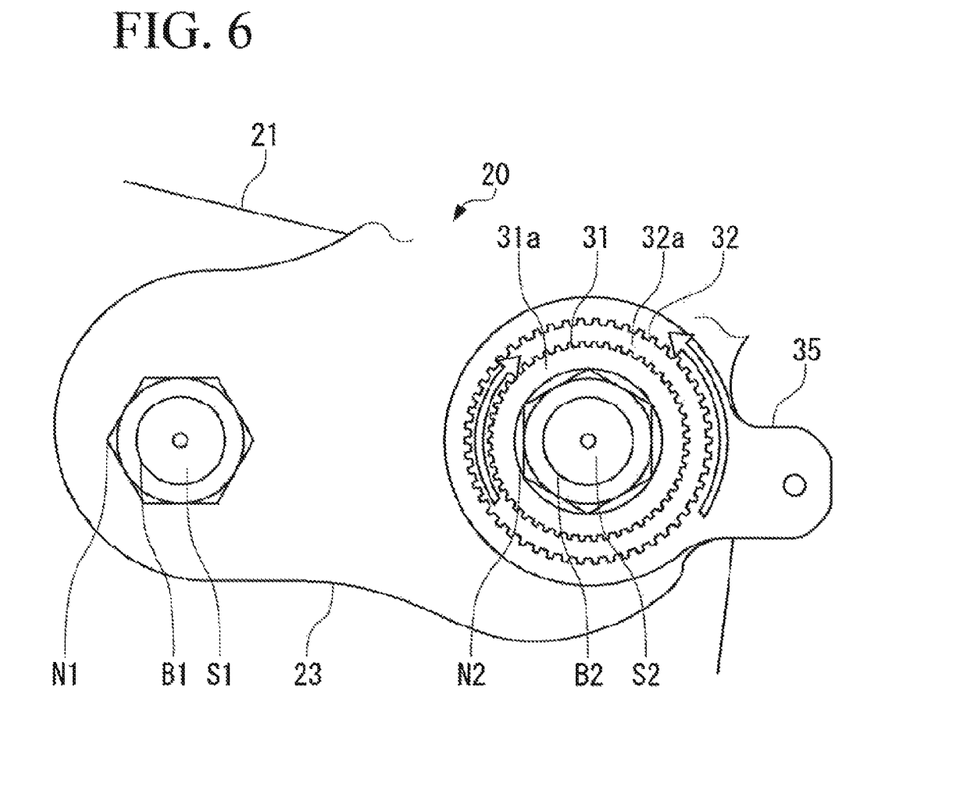
FIG. 6 is a partially enlarged view of FIG. 5.

Next, a position adjustment mechanism 20 of the slat 3 according to the present invention is described by reference to FIGS. 5 to 7.

The position adjustment mechanism 20 is provided between a swing arm 21 that extends toward the rail 12 from the slat 3 and the rail 12. The position adjustment mechanism 20 causes the swing arm 21 to swing (reciprocate) on an arc trajectory about a pivot shaft S1. The slat 3 connected to the swing arm 21 can be thereby caused to swing.

The position adjustment mechanism 20 includes the swing arm 21 that extends toward the rail 12 from the slat 3. Since the swing arm 21 is formed integrally with the slat 3, the slat 3 can swing by following the movement of the swing arm 21.

Figure 7:
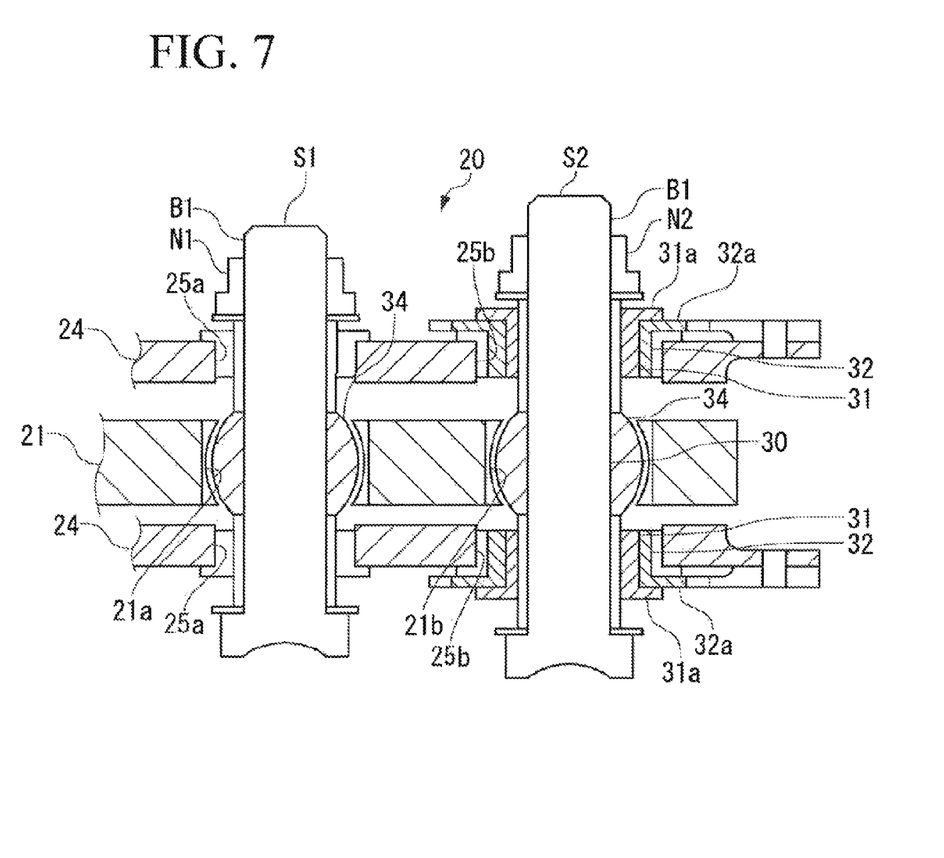
FIG. 7 is a sectional view on an arrow VII-VII in FIG. 5.

A shaft hole 21a through which the pivot shaft S1 passes, and a shaft hole 21b through which a driving shaft S2 passes are formed penetrating through the swing arm 21 as shown in FIG. 7. The shaft hole 21a is provided on a side closer to the slat 3. The shaft hole 21b is provided at a position away from the slat 3 at a predetermined interval from the shaft hole 21a.

The position adjustment mechanism 20 also includes a fixed arm 23 that is formed integrally with the rail 12. The fixed arm 23 is provided extending from a distal end of the rail 12 toward the leading edge 2a of the main wing body 2. The fixed arm 23 includes a pair of arm pieces 24 arranged at a predetermined interval as shown in FIG. 7. The swing arm 21 is arranged between the pair of arm pieces 24 and 24. A shaft hole 25a and a shaft hole 25b are formed penetrating through the respective arm pieces 24 at positions respectively corresponding to the shaft hole 21a and the shaft hole 21b of the swing arm 21.

The pivot shaft S1 includes a bolt B1 having an axially constant diameter, and a nut N1 fitted to the bolt B1 as main elements. The pivot shaft S1 penetrates the pair of arm pieces 24 and the swing arm 21 through the shaft holes 21a and 25a. At least the swing arm 21 is attached rotatably with respect to the pivot shaft S1. A bearing body 34 having a spherical outer shape is attached to the pivot shaft S1 at a position corresponding to the shaft hole 21a of the swing arm 21. The shaft hole 21a has a spherical surface along the outer shape of the bearing body 34. The pair of arm pieces 24 (the fixed arm 23) may be fixed to the pivot shaft S1.

Since the swing arm 21 is attached as described above, the swing arm 21 can swing about the pivot shaft S1. The bolt B1 and the nut N1 are merely one example. The pivot shaft S1 may be configured by using another member in the present invention.

The driving shaft S2 has an eccentric function. When the driving shaft S2 including an eccentric bushing is rotated, the slat 3 can be caused to swing via the swing arm 21.

The driving shaft S2 penetrates the pair of arm pieces 24 and the swing arm 21 through the shaft holes 21b and 25b. The swing arm 21 and the fixed arm 23 are attached rotatably with respect to the driving shaft S2.

The driving shaft S2 includes a main shaft 30, a pair of inner-side eccentric bushings 31 fixed to opposite ends of the main shaft 30, and outer-side eccentric bushings 32 respectively rotatably fitted to the peripheries of the inner-side eccentric bushings 31. The inner-side eccentric bushings 31 and the outer-side eccentric bushings 32 respectively include flanges 31a and 32a at axial end portions. Knurling is axially formed by machining around each of the flanges 31a and 32a (see FIG. 6). The inner-side eccentric bushing 31 and the outer-side eccentric bushing 32 are inserted into the shaft hole 25b of each of the pair of arm pieces 24 (the fixed arm 23). The flange 32a of the outer-side eccentric bushing 32 is supported on the rail 12, and the flange 31a of the inner-side eccentric bushing 31 is supported on the flange 32a. The inner-side eccentric bushing 31 and the outer-side eccentric bushing 32 are made rotatable with respect to each other, and the outer-side eccentric bushing 32 is supported rotatably with respect to the rail 12. The main shaft 30 includes a bolt B2 having an axially constant diameter, and a nut N2 fitted to the bolt B2 as main elements.

The inner-side eccentric bushing 31 is eccentric by an eccentricity $\delta$ with respect to a center C of the main shaft 30 (see FIGS. 8A to 8D). The outer-side eccentric bushing 32 is eccentric by an eccentricity $\delta$ with respect to a rotation axis of the inner-side eccentric bushing 31, and has a rotation axis corresponding to the center C of the main shaft 30.

A bearing body 34 having a spherical outer shape is attached to the driving shaft S2 at a position corresponding to the shaft hole 21b of the swing arm 21. The bearing body 34 is arranged within the shaft hole 21b. When the driving shaft S2 is displaced, the bearing body 34 acts on the swing arm 21 from inside of the shaft hole 21b in a direction of displacement.

A stopper 35 is fitted to the flange 32a of the outer-side eccentric bushing 32 so as to prevent the outer-side eccentric bushing 32 and the inner-side eccentric bushing 31 from moving after rigging. The stopper 35 may be also used as a tool for rotating the outer-side eccentric bushing 32.

[Operation of the Position Adjustment Mechanism 20]

Next, the operation of the position adjustment mechanism 20 during a rigging operation is described by mainly referring to FIGS. 8A to 8D. The rigging operation is normally performed when the slat 3 is at the retracted position.

Figure 8A:
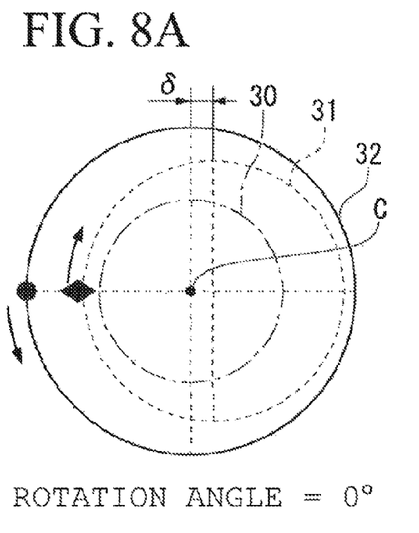
FIGS. 8A to 8D are views for explaining an operation of the position adjustment mechanism of the slat according to the present embodiment.

It is assumed that the inner-side eccentric bushing 31 and the outer-side eccentric bushing 32 are located as shown in FIG. 8A at first. This state is set as a rotation angle=0° (360°) (=an origin position). States of the main shaft 30, the inner-side eccentric bushing 31, and the outer-side eccentric bushing 32 obtained by rotating the inner-side eccentric bushing 31 90° by 90° from the rotation angle of 0° in a clockwise direction, and rotating the outer-side eccentric bushing 32 90° by 90° in a counterclockwise direction in synchronization therewith are sequentially shown in FIG. 8B (rotation) angle=90°), FIG. 8C (rotation angle=180°), and FIG. 8D (rotation angle=270°). The inner-side eccentric bushing 31 and the outer-side eccentric bushing 32 are reversely rotated by the same rotation angles in synchronization so as to cause the main shaft 30 to swing on an arc trajectory around the pivot shaft S1.

Figure 8B:
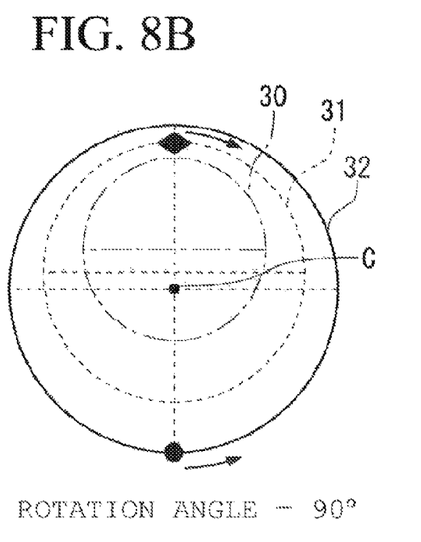

As shown in FIG. 8B, when the inner-side eccentric bushing 31 is rotated 90° in the clockwise direction and the outer-side eccentric bushing 32 is rotated 90° in the counterclockwise direction, the main shaft 30 moves upward in the drawing so as to have an eccentricity of 2δ from the rotation center of the outer-side eccentric bushing 32.

Figure 8C:
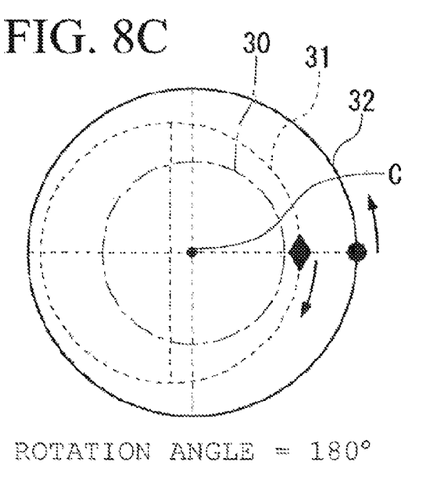

When the inner-side eccentric bushing 31 is further rotated 90° in the clockwise direction (rotation) angle=180° and the outer-side eccentric bushing 32 is further rotated 90° in the counterclockwise direction (rotation angle=180°), the main shaft 30 returns to the origin position with a rotation angle of 0° as shown in FIG. 8C. However, the inner-side eccentric bushing 31 moves to an axisymmetrical position to the origin position.

Figure 8D:
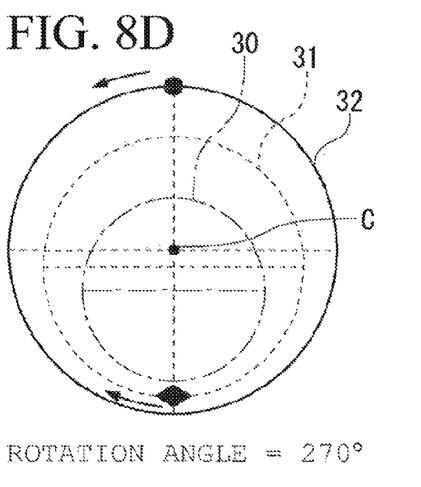

When the inner-side eccentric bushing 31 is further rotated 90° in the clockwise direction (rotation angle=270°) and the outer-side eccentric bushing 32 is further rotated 90° in the counterclockwise direction (rotation angle=270°), the main shaft 30 moves downward in the drawing from the origin position so as to have an eccentricity of 2δ from the rotation center of the outer-side eccentric bushing 32 as shown in FIG. 8D.

As is clear from FIGS. 8A to 8D and the above description, the position adjustment mechanism 20 having the eccentric function enables the main shaft 30 to swing on the arc trajectory about the pivot shaft S1.

The swing arm 21 swings with the pivot shaft S1 as a pivot in accordance with the swing motion of the main shaft 30. The slat 3 is displaced in a width (front-rear) direction of the main wing 1 and a thickness (vertical) direction of the main wing 1 by following the swing motion of the swing arm 21. The rigging can be thereby performed.

As described above, since the position adjustment mechanism 20 having the eccentric function is used in the present embodiment, it is only necessary to provide the two shafts of the pivot shaft S1 and the driving shaft S2. The pivot shaft S1 and the driving shaft S2 can be also arranged linearly along a wing chord direction of the main wing 1. Therefore, as compared to a swing arm 104 of a conventional position adjustment mechanism 100 that requires three shafts, the width (in the wing thickness direction) of the swing arm 21 can be decreased. Thus, a cutout required in the leading edge 2a of the main wing 1 can be made smaller than that of the position adjustment mechanism 100 that requires three shafts. It has been confirmed that the same amount of displacement of the slat 3 as that of the position adjustment mechanism 100 can be naturally obtained in the position adjustment mechanism 20 by setting the position adjustment mechanism 20 and the position adjustment mechanism 100 to the same eccentricity.

In the position adjustment mechanism 20, the pivot shaft S1 is arranged close to the slat 3. Consequently, the position adjustment mechanism 20 has a smaller swing rotation radius than the position adjustment mechanism 100 in which a pivot shaft S101 is away from the slat 3. The amount of displacement of the slat 3 per unit rotation angle of the inner-side eccentric bushing 31 and the outer-side eccentric bushing 32 can be thereby decreased, so that the rigging can be precisely performed.

Please note that it is not the essential condition of the present invention that the pivot shaft S1 is arranged close to the slat 3. In the present invention, the positional relationship between the pivot shaft S1 and the driving shaft S2 may be reversed from that in the position adjustment mechanism 20 by arranging the driving shaft S2 close to the slat 3, and arranging the pivot shaft S1 away from the slat 3 with the driving shaft S2 therebetween. The aforementioned effect that the cutout formed in the leading edge 2a can be made smaller is obtained even in this case.

Although the embodiment of the present invention has been described above, the present invention is not limited to the embodiment described above.

For example, in the position adjustment mechanism 20, the two bushings of the inner-side eccentric bushing 31 and the outer-side eccentric bushing 32 are provided around the main shaft 30 so as to provide the double eccentric function. However, the main shaft 30 and the two bushing portions may be formed in an integral structure as in a crankshaft. A manufacturing cost, however, can be reduced by fixing the inner-side eccentric bushing to the simple cylindrical main shaft as compared to the case in which the crankshaft is formed. When the bushing becomes worn, only the worn portion can be replaced. Thus, a maintenance cost can be also reduced.

The position adjustment mechanism 20 has a symmetrical form with the swing arm 21 held between the pair of arm pieces 24 so as to stabilize the operation of the slat 3 in the rigging. The swing operation of the swing arm 21 is not changed even when only one arm piece 24 (the fixed arm 23) is provided.

Moreover, the bearing body 34 is provided on the main shaft 30. However, the main shaft 30 itself may be in direct contact with the swing arm 21.

The constitutions described in the aforementioned embodiment may be also freely selected or changed into other constitutions without departing from the scope of the present invention.

What is claimed is:

1. A slat of an aircraft comprising:
   a slat body that is attached to a bracket capable of reciprocating with respect to a main wing of the aircraft so as to be movable between a deployed position and a retracted position; and a position adjustment mechanism that adjusts an attachment position of the slat to the main wing by causing the slat body to swing, wherein the position adjustment mechanism includes:

a pivot shaft as a center of the swing motion of the slat body; and a driving shaft that is rotatably supported on the bracket, and induces the swing motion of the slat body, wherein the driving shaft includes:

a main shaft that causes the slat body to swing by acting thereon; and an eccentric body that is supported rotatably with respect to the bracket, and rotates integrally with the main shaft, wherein the eccentric body includes:

a cylindrical inner-side eccentric body that is fixed to the main shaft, and eccentric with respect to the main shaft, and a cylindrical outer-side eccentric body that is eccentric with respect to the inner-side eccentric body, rotatably arranged around the inner-side eccentric body, and supported rotatably with respect to the bracket.

2. The slat of an aircraft according to claim 1, wherein the pivot shaft is arranged on a side closer to the slat body than the driving shaft.

3. The slat of an aircraft according to claim 1, wherein an eccentricity δ1 of the inner-side eccentric body from the main shaft and an eccentricity δ2 of the outer-side eccentric body from the inner-side eccentric body correspond to each other.

4. The slat of an aircraft according to claim 1, wherein the inner-side eccentric body is an inner-side eccentric bushing that is fixed to the main shaft, and the outer-side eccentric body is an outer-side eccentric bushing that is arranged around the inner-side eccentric body.

5. A method for adjusting a position of the slat of an aircraft according to claim 1, comprising reversely rotating the inner-side eccentric body and the outer-side eccentric body by a same rotation angle.

6. An aircraft comprising a main wing where the slat according to claim 1 is arranged on a leading edge side as a high-lift device.

* * * * *